United States Patent [19]

Lotspih

[11] Patent Number: 5,445,407

[45] Date of Patent: Aug. 29, 1995

[54] AIR BAG MODULE

[75] Inventor: John A. Lotspih, Englewood, Ohio

[73] Assignee: General Motors Corporation, Detroit, Mich.

[21] Appl. No.: 248,125

[22] Filed: May 24, 1994

[51] Int. Cl.⁶ ............................................ B60R 21/16
[52] U.S. Cl. ................................. 280/728.2; 280/732
[58] Field of Search ............... 280/728 A, 728 R, 731, 280/732

[56] References Cited

U.S. PATENT DOCUMENTS 4,153,273  5/1979  Risko .
4,964,654 10/1990  Bishop et al. ................. 280/728 A
5,062,664 11/1991  Bishop et al. ................. 280/728 A
5,255,937 10/1993  EmanBakksh et al. .
5,332,259  7/1994  Conlee et al. ..................... 280/731

Primary Examiner—Eric D. Culbreth
Attorney, Agent, or Firm—Howard N. Conkey

[57] ABSTRACT

An air bag module for installation in a vehicle includes a module retainer mounted to the vehicle and including a single rod bent to form the module retainer. An air bag is operatively connected to the rod and an inflator is captured by the rod and held in position relative to the vehicle by the rod.

14 Claims, 3 Drawing Sheets

AIR BAG MODULE

This invention relates to an air bag assembly including an air bag module for installation in a vehicle.

BACKGROUND OF THE INVENTION

It is well known in motor vehicles to provide an air bag assembly for protection of a vehicle occupant. The air bag assembly typically includes an air bag module located beneath the surface of the instrument panel.

Air bag modules have been developed for assembly in a modular form. A common type of air bag module includes an inflator, a housing for holding the inflator and including an air bag deployment opening, and an air bag normally stored in a folded condition within the housing near the housing opening. The housing is normally made of sheet metal and, during vehicle assembly, the entire module is attached via the housing to the instrument panel support structure located beneath a cover door formed in or mounted on the upper or rearward surface of the instrument panel in front of the passenger seat.

The cushion is normally positioned atop the inflator near the opening in the housing, so that, upon the vehicle experiencing a predetermined rate of change in velocity, the inflator discharges gas to inflate the air bag for deployment through the opening and for forcibly opening the cover door.

As an alternative to these modules, some vehicles are designed to incorporate the housing as an integral part of the instrument panel support structure. This enables the use of a simplified air bag module which does not include the housing. Such a simplified module in current use is known as a "soft-pack" module and typically comprises an inflator, an inflator retainer for supporting the inflator, and an air bag which lies atop the inflator and is held in place by an air bag retainer.

The prior art includes some simplified modules in which the inflator is operatively connected by the inflator retainer to the housing adjacent a bottom housing opening. In other modules, the inflator is directly connected to the housing by insertion through a side opening included in the housing. These arrangements require that manufacturing operations be performed on the housing to provide either a side opening or a bottom opening to accommodate connection of the inflator to the housing. Access to perform these manufacturing operations can be difficult when the housing is provided as an integral part of the instrument panel support structure. In addition, assembly of the inflator to the integral housing via a side or bottom opening may be difficult due to limited access underneath the instrument support structure.

The prior art also includes other simplified air bag modules in which the entire module, including the inflator, is capable of unidirectional insertion into the housing via the housing opening. Thus, the same housing opening which is easily accessible during vehicle assembly is used for both module installation and air bag deployment. Therefore, additional manufacturing operations typically performed on the housing to provide insertion access or support for the inflator are eliminated.

It is typical in existing simplified air bag modules, to have the air bag located atop the inflator. However, this arrangement may permit some discharging inflator gas directed towards the air bag to leak out through the housing opening into ambient air, thus reducing the inflator gas available for air bag inflation.

Furthermore, the simplified modules typically include an inflator retainer made of stamped, cast or machined metal and having a complex shape resulting in increased manufacturing costs for the air bag module. These inflator retainers also typically have substantial structure which adds weight to the air bag module.

Thus, it would be desirable to provide an improved simplified air bag module which has reduced mass, which is simple and inexpensive to manufacture, and which maximizes the utilization of inflator gas for air bag inflation.

SUMMARY OF THE INVENTION

In accordance with the present invention, an air bag module in a vehicle includes a module retainer mounted to the vehicle, and an inflator which generates gas to inflate the air bag. The inflator is captured by the module retainer and held in position relative to the vehicle by the module retainer. In addition, an air bag is operatively connected to the module retainer.

It is an object of the present invention to provide to an air bag module which is simple and inexpensive to manufacture by eliminating the need for tooling and stamping dies, casting, and machining operations typically required to manufacture a support for holding the inflator of an air bag module. To accomplish this objective, the module retainer of the present invention comprises a single rod bent to form the module retainer. The rod may be an inexpensive length of stock wire or tubular material and can be inexpensively made by simple forming or bending operations. This results in significant reductions in material and manufacturing costs.

In a preferred form of the invention, the rod includes a plurality of spaced apart loops, each engaging the inflator by interference-fitted connection therewith to hold the inflator in position relative to the vehicle. This interference-fitted connection between the loops and the inflator has the advantages of reducing rattles and being easy to assemble without the use of fasteners.

In addition, the single rod provides a lightweight, yet sturdy support for the inflator which reduces the mass of the air bag module.

The present invention is also concerned with providing an air bag module which permits flexibility in manufacturing to enable quick implementation of design changes to the air bag module. Since the module retainer comprises a single rod which is bent to form the module retainer, the rod can easily be bent to form numerous shapes which can hold a variety of inflators and which can accommodate a variety of air bag connection techniques, with significantly reduced manufacturing costs.

In the present invention, the air bag is operatively connected to the rod, and the inflator is captured by the rod. Thus, the three component parts of the air bag module (rod, air bag, and inflator) are held together as a unit independent of the vehicle. This arrangement has the advantage of minimizing the number air bag module component parts which are assembled, since a separate air bag retainer is unnecessary.

A preferred form of the invention includes the rod located within the air bag and the inflator located substantially within the air bag. The inflator engages the air bag at a side opening to trap the air bag between the rod and the inflator such that the air bag is operatively connected to the rod at the side opening of the air bag.

This arrangement has the advantage of maximizing the utilization of discharging inflator gas for air bag inflation by discharging the inflator gas directly into the air bag.

The embodiments of the invention are characterized by flexibility, simplicity, and significantly reduced expenses in manufacturing of the air bag module as permitted by the module retainer comprising a single rod which is bent to form the module retainer. The present invention is also characterized by minimization of component parts of the air bag module and reduction of mass.

BRIEF DESCRIPTION OF THE DRAWINGS

These and other features, objects, and advantages of the present invention will become apparent upon consideration of the following description of the preferred embodiment, appended claims, and accompanying drawings in which:

DESCRIPTION OF THE PREFERRED EMBODIMENT

Figure 1:
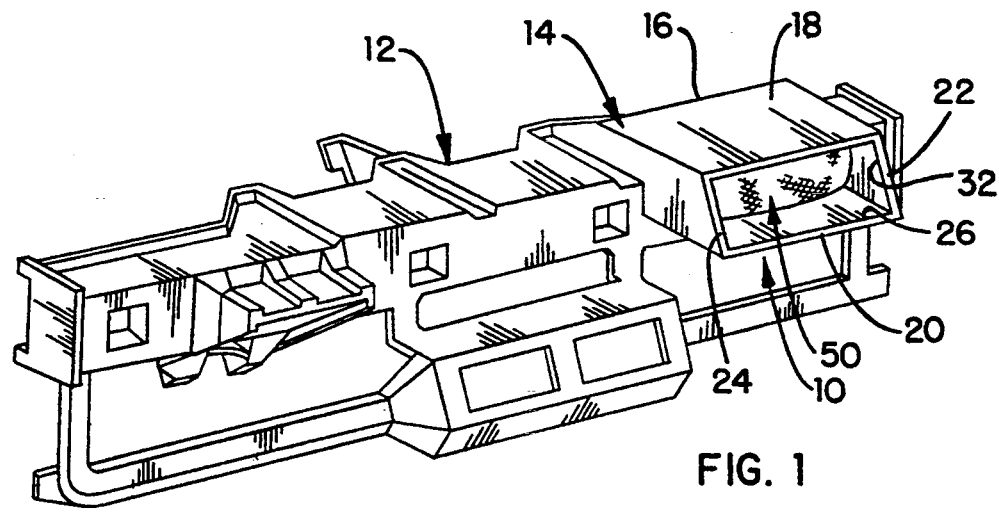
FIG. 1 is a rear prospective view of an instrument panel support structure having an integral housing.
Figure 2:
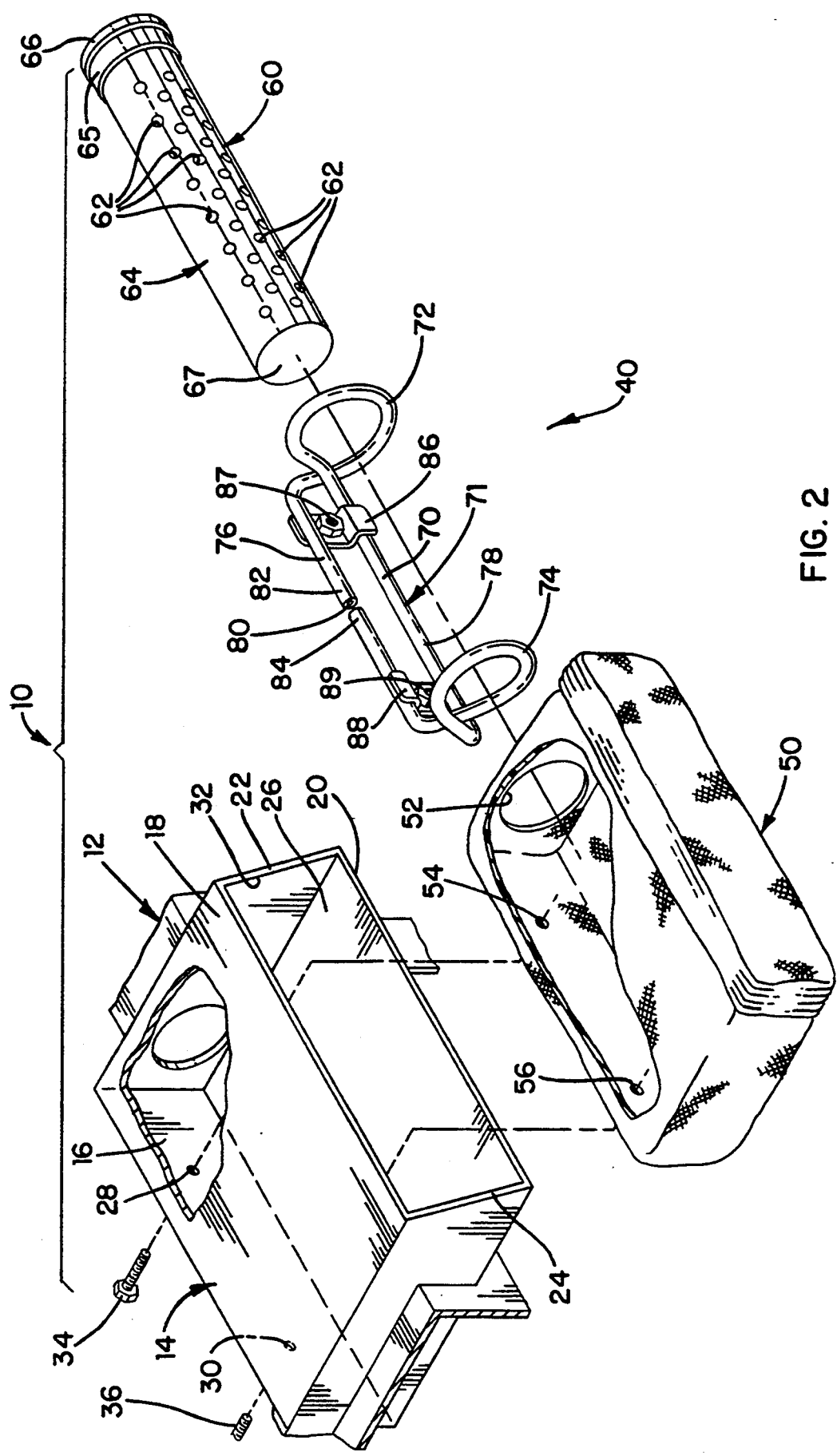
FIG. 2 is a view similar to FIG. 1 showing the housing partially broken away and further including an exploded rear perspective view of an air bag module showing an air bag partially broken away.

Referring to FIG. 1, it is seen that a passenger vehicle includes an instrument panel support structure 12 preferably being a single magnesium casting. Referring to FIGS. 1 and 2, the instrument panel support structure 12 includes an integral air bag housing 14 including a forward wall 16 connected to spaced apart opposed top and bottom side walls 18, 20 and right and left end walls 22, 24. The walls 16, 18, 20, 22, 24 cooperatively define a contained housing interior 26. Referring to FIG. 2, the contained housing interior 26 is a substantially enclosed volume except for right and left mounting apertures 28, 30 on the forward wall 16 and a rearward housing opening 32 cooperatively defined by the side and end walls 18, 20, 22, 24.

FIG. 2 illustrates the component parts of a complete air bag assembly, generally designated as 10. The component parts include the air bag housing 14 and an air bag module generally designated as The module 40 is a simplified or so called "soft-pack" module designed for installation into the vehicle which incorporates the housing 14 as an integral part of the instrument panel support structure 12. The component parts of the module 40 include an air bag 50, an inflator 60 for generating gas to inflate the air bag 50, and a module retainer 71 comprising a single rod 70 for holding the inflator 60 in position relative to the housing 14. The modular retainer 71 also includes right and left fasteners 34, 36 for securing the rod 70 to the housing 14.

Figure 3:
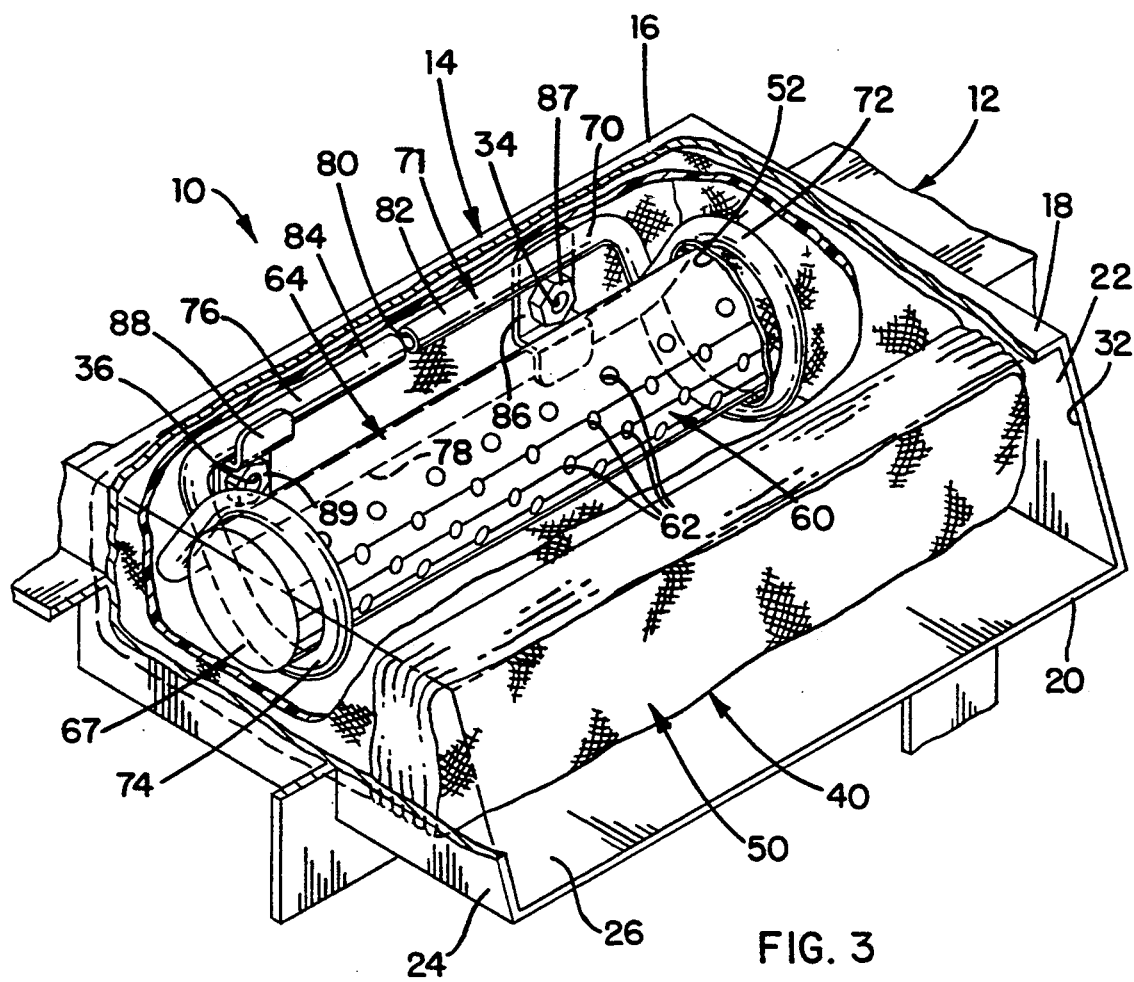
FIG. 3 is a view similar to FIG. 1 showing an air bag assembly including the housing and air bag module in an assembled condition, and showing the housing and the air bag partially broken away.

As best shown in FIG. 2, the air bag 50 forms an enclosed air bag interior except for a side opening 52 which is sized for receiving the rod 70 and inflator 60 therethrough, as will be further described hereinafter. Referring to FIGS. 1, 2 and 3, the air bag 50 is located substantially within the housing 14 and the rearward portion of the air bag 50 is normally stored in a folded condition near the housing opening 32. The air bag 50 further includes right and left fastener openings 54, 56 which matably align with the right and left mounting apertures 28, 30, respectively, on the forward wall 16 of the housing 14.

As best shown in FIG. 2, the inflator 60 may be of any conventional construction which contains chemicals for igniting to generate gas for discharge, such as through ports 62 in its main elongated cylindrical portion 64. Inflator 60 includes a collar portion 65 having a diameter greater than the main cylindrical portion 64 and an end cap 66 with a diameter greater than the collar 65. The inflator 60 includes an integral end portion 67 having the same outside diameter as the main cylindrical portion 64.

As best shown in FIGS. 2 and 3, the module retainer 71 is comprised of a single rod 71 bent to form the shape of the module retainer 71. The rod 70 is preferably a single length of inexpensive stock wire or tubular element of a metallic composition. The rod 70 is preferably bent to include generally circular right and left end loop segments 72, 74 which are in parallel alignment with each other and which are spaced axially apart. The loops 72, 74 are oriented to form an axial passageway therethrough. Preferably, the rod 70 is bent to shape by the use of inexpensive tooling, such as a looping machine or forming machine. The right and left end loops 72, 74 each engage a respective end of the inflator 60 by interference-fitted connection therewith to hold the inflator 60 in position relative to the housing 14. The rod 70 further includes integral top and bottom rod portions 76, 78 extending axially between the right and left end loops 72, 74. The top rod 76 includes a gap 80 formed between a first end 82 and a second end 84 of the rod 70. The rod 70 is preferably enclosed within the air bag 50 and is also located within the housing 14 when the module 40 is installed in the housing 14.

A right tab 86 and a left tab 88 of the modular 71 each engage the top and bottom rod portions 76, 78 of the rod 70, respectively, at opposite ends, and are preferably pre-welded thereto. Furthermore, right and left nuts 87, 89 are preferably pre-welded to the right and left tabs 86, 88, respectively. The right and left nuts 87, 89 and associated tab openings (not shown) are matably aligned with the right and left fastener openings 54, 56 in the air bag 50 and the right and left mounting apertures 28, 30 in the housing 14, respectively, such that the right and left fasteners 34, 36 are received therethrough to secure the rod 70 to the housing 14.

Referring now to FIGS. 2 and 3, assembly of the module 40, independent of the housing 14, will now be described.

Referring to FIG. 2, the module 40 is assembled as follows. The rod 70 including the pre-welded right and left tabs 86, 88 is inserted lengthwise through the side opening 52 in the air bag 50 with the left end loop 74 leading until the entire rod 70 is enclosed within the air bag 50. Next, the inflator 60 is axially inserted endwise, with the integral end portion 67 leading, through the side opening 52 in the air bag 50 until the collar 65 of the inflator 60 engages the right end loop 72. The collar 65 and end cap 66 are sized larger than the side opening 52 and cooperatively trap the air bag 50 between the inflator 60 and the right end loop 72 when the inflator 60 is fully inserted such that the air bag 50 is operatively connected to the rod 70. In this position, the inflator 60 is located substantially within the air bag 50 except for collar 65 and end cap 66 which extend out beyond the side opening 52 of the air bag 50. Thus, the air bag 50 surrounds the inflator 60 and rod 70. The fully-inserted inflator 60 engages the side opening 52 of the air bag 50, such that the side opening 52 is closed from communication with ambient air.

Contemporaneous with insertion of the inflator 60 through the side opening 52 in the air bag 50, the inflator 60 is inserted axially into the right and left end loop segments 72, 74 such that rod 70 captures the inflator 60 by interference-fitted connection therewith. More particularly, the right and left end loops 72, 74 each engage the main cylindrical portion 64 of the inflator 60. This interference-fitted connection has the advantages of eliminating rattles and being easy to assemble without the use of fasteners.

It is to be noted that the module 40, as assembled, is sufficiently sturdy for storage or transport to a vehicle assembly location for subsequent insertion into the housing 14. To facilitate assembly and transport of the module 40, it will be appreciated that the folded portion of the air bag may be temporarily secured in the folded condition, such as by a surrounding flexible band (not shown).

Completion of the air bag assembly 10, including installation of the module 40 into the housing 14, is easily completed as follows with reference to FIGS. 1, 2 and 3. The entire module 40 is slip-fittedly inserted into the housing interior 26 by unidirectional insertion in a generally forward direction via the housing opening 32. The rod 70 is mounted to the forward wall 16 of the housing 14, preferably by securing the right and left fasteners 34, 36 to the right and left tabs 86, 88, respectively.

When the module 40 is installed in the housing 14, the top and bottom rod portions 76, 78 of the rod 70 trap the air bag 50 against the forward wall 16 of the housing 14 to operatively connect the air bag 50 to the housing 14. It is evident that in this installed condition, the inflator 60 extends axially between the right and left end loops 72, 74 of the rod 70 and is held in position relative to the housing 14 by the rod 70.

Upon actuation, the inflator 60 discharges inflator gas. The ports 62 of the inflator 60 direct the discharging inflator gas rearwardly towards the folded portion of the air bag 50 to inflate the air bag 50, which will deploy out through the housing opening 32 in a well known manner. Since the inflator 60 and rod 70 are located substantially within the air bag 50 and since the inflator 60 engages the side opening 52 of the air bag 50, it will be appreciated that inflator gas is discharged directly into the interior of the air bag 50 thereby preventing discharging inflator gas from leaking out through the housing 14 and maximizing utilization of inflator gas for air bag 50 inflation.

A heat shield (not shown) may be provided inside the air bag 50, to protect the air bag 50 from heat typically associated with actuation of the inflator 60.

Since only two fasteners 34, 36 are required in the entire air bag assembly 10 and since the module 40 is unidirectionally inserted into the housing interior 26 via the housing opening 32, it will be appreciated that minimal access is required underneath instrument panel support structure 12, thus enabling facile installation of the module 40 into the housing 14.

Since the inflator 60 is held within the housing 14 and positioned relative the housing 14 by the rod 70, and since the housing opening 32 serves as both an air bag deployment opening and an access opening for insertion of the entire module manufacturing operations typically performed on the housing 14 for holding and inserting the inflator 60 are eliminated.

Although the preferred embodiment utilizes a directional inflator 60, it will be appreciated that a variety of inflator types, for example, such as a non-directional inflator may also be used.

Although the preferred embodiment illustrates a particular configuration of the rod 70, it will be appreciated that numerous other configurations are possible which will hold various sizes and shapes of inflators. In addition, the rod may easily be configured to hold an inflator with a surrounding baffle or diffuser which may be desirable to use, for example, with a non-directional inflator.

It will further be appreciated that by bending a single rod to form the module retainer, weight is reduced and expensive manufacturing costs associated with stamping or tooling dies, machining, or casting for the module retainer are eliminated. Thus, it will be appreciated that the design of the module retainer, such as length, width, loop diameter, number of loops, rod cross-section, etc., can easily be varied to accommodate various inflators, air bag attachments, and other design changes while utilizing the same inexpensive tooling, such as a looping or forming machine. Thus, manufacturing and material costs for the air bag module 40 are significantly reduced.

It will be apparent that the simple open structure of the rod easily permits venting of discharged inflator gas by simply providing venting apertures (not shown) in the air bag 50 and housing 14. It is also contemplated that the simple open structure of the rod may easily be utilized with ambient air augmentation of discharging inflator gas by adding aspiration apertures (not shown), for example through the forward wall 16 of the housing 14 and air bag 50.

Although the preferred embodiment utilizes a housing 14 which is integral with the instrument panel support structure 12, it will be appreciated that the module 40 may also be installed in an air bag housing which is separate from the vehicle. Furthermore, it is contemplated that the rod 70 of the module 40 may also be attached directly to a mounting surface, such as a flat plate mounted to the vehicle, such that the housing 14 is eliminated. This is possible in part because the inflator 60 and rod 70 are substantially enclosed within the air bag 50.

It will further be appreciated that many different attachment methods may be used to operatively connect the air bag 50 to the rod 70, and are contemplated for use with the rod of the present invention. Thus, a separate air bag retainer is unnecessary.

Figure 4:
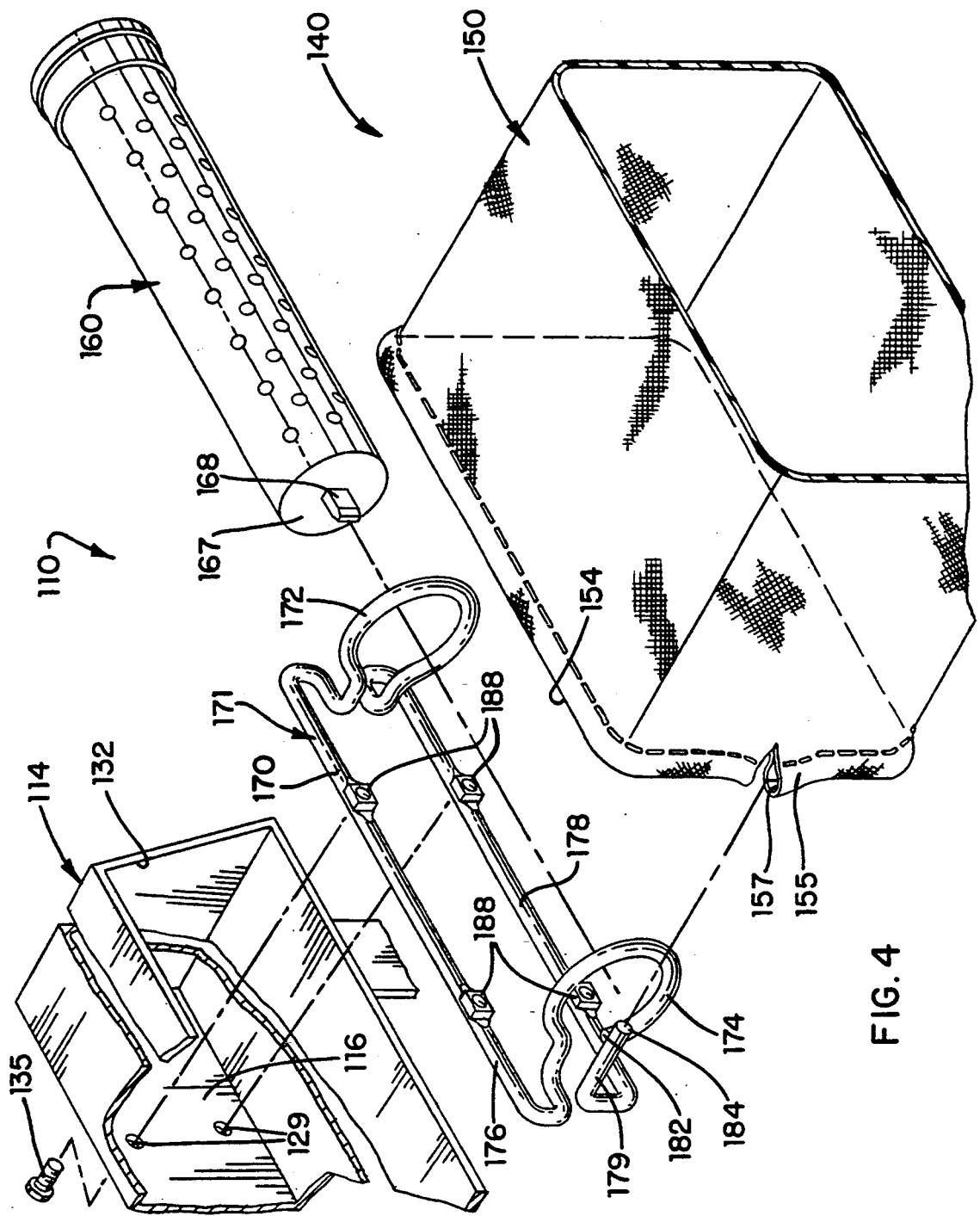
FIG. 4 is a view similar to FIG. 2, but showing an alternate embodiment of the invention.

FIG. 4 shows an alternate embodiment of the invention illustrating an alternate configuration of a rod 170 and showing an alternate arrangement for operatively connecting the air bag 150 to the rod 170.

FIG. 4 illustrates an exploded view of a complete air bag assembly, generally designated as 110. The component parts include the air bag housing 114 including a housing opening 132 and an air bag module generally designated as 140. The component parts of the module 140 include an air bag 150, an inflator 160, and a modular retainer 171.

Referring to FIG. 4, the modular retainer 171 includes a rod 170 having a solid circular cross-section and bent to form the shape of the module retainer 171.

The rod 170 preferably includes right and left end loop segments 172, 174 each having a semi-circular shape, being spaced axially apart, and being in parallel alignment with each other to form an axial passageway therethrough. The loop segments 172, 174 each engage a respective end of the inflator 160 by interference-fitted connection therewith to hold the inflator 160 in position relative to the housing 114. The rod 170 further includes top and bottom rod portions 176, 178 extending axially between and connecting the right and left end loops 172, 174.

In this particular embodiment, a first end 182 of the rod 170 is located on the left end loop 174, and a second end 184 of the rod 170 extends generally perpendicular to the bottom rod portion 178 to form a left post portion 179. The semi-circular configuration of the right and left end loops 172, 174 permits facile assembly of the air bag 150 onto the rod 170, as will be described hereinafter.

The air bag 150 includes a hem loop 155 having a slitted opening 157. The hem loop 155 is sized for slip-fitted axial connection onto the rod 170 to operatively connect the air bag 150 to the rod 170.

The inflator 160 is similar to that shown in the preferred embodiment, but preferably includes a central orientation lug 168 mounted to an integral end portion 167.

To assemble the module 140, the hem loop 155 of the air bag 150 is slip-fittedly connected onto the rod 170, preferably starting at the second end 184 of the rod 170 until the rod 170 is contained substantially within the hem loop 155. After insertion of the rod 170 into hem loop 155 the right and left end loops 172, 174 provide an open axial passageway through which the inflator 160 is axially inserted with the orientation lug 168 leading through the right end loop 172. When the inflator 160 is fully inserted, the second end 184 of the left post portion 179 engages the inflator orientation lug 168 to prevent inflator 160 rotation. In addition, the inflator 160 is located substantially within the air bag 150 except for the axial ends of the inflator 160 which extend out beyond the right and left end loops 172, 174.

To complete the air bag assembly 110, the entire module 140 is slip-fittedly inserted into the housing 114 by unidirectional insertion in a generally forward direction via the housing opening 132. The modular retainer 171 includes a plurality of fasteners 135 to secure the rod 170 to the housing 114. The top and bottom portions of the rod 176, 178 may preferably include fastening apertures (not shown) matably aligned with pre-welded nuts 188 which matably align with respective mounting apertures 129 in a forward wall 116 of the housing 114. The hem loop 155 of the air bag 150 may preferably include air bag holes (not shown) which also matably align for receiving respective fasteners 135 therethrough.

It will be appreciated that the alternate embodiment shown in FIG. 4 is readily adaptable to aspiration and venting by providing aspiration holes in the forward wall 116 of the housing 114 since an open mouth portion 154 of the air bag 150 is adjacent the forward wall 116 of the housing 114 when the module 140 is installed in the housing 114.

While the present invention has been described as carried out in a specific embodiment thereof, it is not intended to be limited thereby but is intended to cover the invention broadly within the scope and spirit of the appended claims.

The embodiments of the invention in which an exclusive property or privilege is claimed are defined as follows:

1. An air bag module in a vehicle comprising:
   a module retainer comprising a single rod bent to form the module retainer, the rod including integral, axially spaced apart first and second end loop segments, the rod including at least one integral elongated rod portion extending axially between the first and second end loop segments and having two ends, one end connected to the first end loop segment and the other end connected to the second end loop segment, the rod mounted to the vehicle;
   an air bag operatively connected to the rod; and
   an inflator captured within the first and second end loop segments of the rod and held in position relative to the vehicle by the rod, the inflator for generating gas to inflate the air bag.

2. The air bag module of claim 1 wherein the at least one integral elongated rod portion includes two parallel spaced apart elongated rod portions each being fastened to the vehicle.

3. The air bag module as in claim 1 wherein the elongated rod portion is generally perpendicular to the first and second end loop segments.

4. The air bag module as in claim 1 wherein the at least one integral elongated rod portion includes two parallel spaced apart elongated rod portions and wherein each of the elongated rod portions is fastened to the vehicle.

5. The air bag module as in claim 1 wherein the inflator includes an inflator orientation lug and wherein the rod has two rod ends, one of the rod ends being perpendicular to the elongated rod portion and engaging the orientation lug of the inflator.

6. The air bag module as in claim 1 wherein the rod and the inflator are located substantially inside the air bag.

7. The air bag module as in claim 1 wherein the air bag includes at least one hem loop, the rod is captured substantially within the hem loop, and the inflator is located inside the air bag.

8. An air bag module for installation in an air bag housing having a housing opening, the air bag module comprising:
   a module retainer comprising a single rod bent to form the module retainer, the rod including integral, axially spaced apart first and second end loop segments, the rod including at least one integral, elongated rod portion extending axially between the first and second end loop segments and having two ends, one end connected to the first end loop segment and the other end connected to the second end loop segment, the rod mounted to the housing and located within the housing;
   an air bag operatively connected to the rod, the air bag for deployment through the housing opening; and
   an inflator captured within the first and second end loop segments of the rod and held in position relative to the housing by the rod when the air bag module is installed in the housing, the inflator for generating gas to inflate the air bag.

9. The air bag module of claim 8 wherein the at least one integral elongated rod portion includes two parallel spaced apart elongated rod portions each being fastened to the housing.

10. The air bag module of claim 8 further characterized by said first and second end loop segments being in parallel alignment with each other.

11. The air bag module of claim 8 wherein the rod includes a cross-section, and the air bag includes an open mouth portion, the air bag is folded to define at least one hem loop extending around the open mouth portion, the hem loop having a slitted opening sized larger than the cross-section of the rod for facile insertion of the rod into the hem loop via the slitted opening, and wherein the rod is contained substantially within the hem loop, whereby the air bag is operatively connected to the rod.

12. An air bag assembly including an air bag housing having a housing opening and an air bag module, the air bag module comprising:

an air bag having a side opening;

a module retainer located within the air bag and comprising a single rod bent to form the module retainer, the rod including integral, axially spaced apart first and second end loop segments, the rod including at least one integral elongated rod portion extending axially between the first and second end loop segments and having two ends, one end connected to the first end loop segment and the other end connected to the second end loop segment, the rod mounted to the housing;

an inflator captured within the first and second end loop segments of the rod and held in position relative to the housing by the rod, the inflator located substantially within the air bag and engaging the air bag at the side opening to trap the air bag between the inflator and one of the first and second end loop segments of the rod; and the inflator for generating gas to inflate the air bag.

13. The air bag assembly of claim 12 further characterized by said first and second end loop segments being in parallel alignment with each other.

14. The air bag module of claim 12 wherein the at least one integral elongated rod portion includes two parallel spaced apart elongated rod portions, each elongated rod portion being fastened to the housing.

* * * * *